(12) United States Patent
Daniels

(10) Patent No.: US 8,752,287 B2
(45) Date of Patent: Jun. 17, 2014

(54) METHOD OF SEALING AT LEAST ONE ENGINE GAS LEAK

(76) Inventor: Melvin James Daniels, Yardley, PA (US)

(*) Notice: Subject to any disclaimer, the term of this patent is extended or adjusted under 35 U.S.C. 154(b) by 649 days.

(21) Appl. No.: 13/066,150

(22) Filed: Apr. 7, 2011

(65) Prior Publication Data

US 2012/0255172 A1   Oct. 11, 2012

(51) Int. Cl.
*B23P 6/00* (2006.01)

(52) U.S. Cl.
USPC ............ 29/888.011; 29/402.01; 29/402.09; 29/402.18; 523/109

(58) Field of Classification Search
CPC ............ A61K 6/10; B23P 6/04; F16L 55/18
USPC ............ 29/888.011, 402.01, 402.09, 402.18; 523/109; 428/66.4, 200, 346, 347
See application file for complete search history.

(56) References Cited

U.S. PATENT DOCUMENTS

| | | |
|---|---|---|
| 3,453,242 A | 7/1969 | Schmitt et al. |
| 4,331,722 A | 5/1982 | Packo et al. |
| 4,532,268 A | 7/1985 | Jochum et al. |
| 4,830,383 A | 5/1989 | Probst |
| 5,130,348 A | 7/1992 | Zahler et al. |
| 5,275,139 A | 1/1994 | Rosenquist |
| 5,286,105 A | 2/1994 | Herold et al. |
| 5,434,198 A | 7/1995 | Meurer et al. |
| 5,674,944 A | 10/1997 | Falla et al. |
| 5,850,813 A | 12/1998 | Cooney et al. |
| 5,907,002 A | 5/1999 | Kamohara et al. |
| 6,003,878 A | 12/1999 | Noble et al. |
| 6,129,360 A | 10/2000 | Walker et al. |
| 6,173,966 B1 | 1/2001 | Noble et al. |
| 6,555,056 B2 | 4/2003 | Nakagawa et al. |
| 6,767,395 B2 | 7/2004 | Erick |
| 6,919,386 B2 | 7/2005 | Wanek et al. |
| 7,556,002 B2 | 7/2009 | Jialanella |
| 7,695,819 B2 | 4/2010 | Farhat |
| 7,838,572 B2 | 11/2010 | Klettke et al. |
| 2004/0262854 A1 | 12/2004 | Matczak et al. |
| 2005/0234208 A1 | 10/2005 | Koch et al. |
| 2005/0285353 A1 | 12/2005 | Rueger et al. |

FOREIGN PATENT DOCUMENTS

| | | |
|---|---|---|
| WO | WO 00/75538 A1 | 12/2000 |
| WO | WO 2009/085183 A2 | 7/2009 |

OTHER PUBLICATIONS

McKenna, Kevin; NHRA Stories, "Daniels gets a grip on Hemi Challenge title" Sep. 3, 2010, http://www.nhra.com/story/2010/9/3/daniels-gets-a-grip-on-hemi-challenge-title/.
3M ESPE, Impregum(TM) Penta(TM) Soft Heavy Body/Light Body/Medium Body Impression Material Technical Product Profile.

(Continued)

*Primary Examiner* — Sarang Afzali
(74) *Attorney, Agent, or Firm* — Culotta Law Firm, PLLC

(57) ABSTRACT

A method of sealing at least one gas leak in an engine including the steps of locating at least one gas leak applying, an alkyl polyether composition and a crosslinking composition to at least one surface of the engine within three inches of the located gas leak and allowing a polyether dental impression material to form by reacting to seal the located gas leak.

15 Claims, 5 Drawing Sheets

Locate at least one gas leak in an engine

Apply the alkyl polyether and crosslinking components within three inches of at least one located gas leak

OR

Pre-mix an alkyl polyether composition and a crosslinking composition to form a dental impression material and apply within three inches of a located gas leak in an engine Repeat the aforementioned steps as many times as necessary to seal a substantial number of engine gas leaks.

(56) References Cited

OTHER PUBLICATIONS

Zare, Abdolkarim et. al., Phosphorus, Sulfur, and Silicon, 184:1702-1712, (2009) (Taylor & Francis Group, LLC) "KF/Al2O3 as an Efficient, Green, and Reusable Catalytic System for the Solvent-Free Synthesis of N-Alkyl Derivatives of Sulfonamides via Michael Reactions".

Pandit, Shivaji S. et. al.Journal of Sulfur Chemistry® 29(6), 619-622 (Dec. 2008) (Taylor & Francis Group, LLC) "Rapid and Efficient Synthesis of Sulfonamides From Sulfonic Acid and Amines Using Cyanuric Chloride-DMF Adduct".

Bonk, Jason D., et. al., Synthetic Communications®, 37: 2039-2050, (2007) (Taylor & Francis Group, LLC) "Convenient One-Pot Synthesis of Sulfonamides from Thiols using Trichloroisocyanuric Acid".

Wynberg, Natalie A., et. al., Can. J. Chem. 83: 661-667 (2005) (NRC Canada) "Synthesis and Catalysed Hydroboration of Styryl Sulfonamides".

Inventor observed mixing gun used in the dental profession at a race track in Baytown, TX on Apr. 9, 2010. The contents of the gun were unknown.

FIGURE 3

$R^2S(O)_2NHR^3$

FIGURE 5

Locate at least one gas leak in an engine

Apply the alkyl polyether and crosslinking components within three inches of at least one located gas leak

OR

Pre-mix an alkyl polyether composition and a crosslinking composition to form a dental impression material and apply within three inches of a located gas leak in an engine Repeat the aforementioned steps as many times as necessary to seal a substantial number of engine gas leaks.

METHOD OF SEALING AT LEAST ONE ENGINE GAS LEAK

CROSS REFERENCE TO RELATED APPLICATIONS

Not applicable.

FEDERALLY SPONSORED RESEARCH

Not applicable.

FIELD OF THE INVENTION

The invention relates to a method of locating and sealing gas leaks in an engine using a dental impression material comprised of at least an alkyl polyether composition and a crosslinking composition.

BACKGROUND OF THE INVENTION

An engine generates useful power by taking in air and fuel and creating power in a combustion reaction within a closed cylinder. The power of the combustion in the closed cylinder creates useful power by transmitting force to an engine crankshaft. A throttle in an engine regulates the amount of air that an engine may take in using an applied vacuum source. When the throttle position is completely open, the engine takes in the most amount of air by reducing intake air manifold pressure. Fuel is injected into the engine. More combustion occurs in a closed cylinder. More power is generated. Conversely, when the throttle position is completely closed, an engine takes in the least of air it can take in using an applied vacuum source from the intake air manifold. The minimum amount of air and fuel is combusted in a closed cylinder. The engine generates the least amount of power that the engine can generate.

Even a small leak of any kind in an engine detracts from the maximum amount of power that an engine can generate. The effect of an engine gas leak may be easily perceived by the human senses as sub-optimal engine performance. When the engine is the power source in a motorized apparatus controlled by a human, the human experience may be reduced power delivery from the engine relative to engine performance prior to development of a gas leak.

Liquid leaks are usually positive pressure leaks. Pressure behind a liquid causes a leak to form when the liquid seeks out a lower pressure region. Some liquid leaks are relatively easy to observe and repair by sealing. Gas leaks may be positive pressure or negative pressure. Finding a gas leak, whether positive pressure or negative pressure, may be relatively more difficult than a liquid leak. A gas expands to fill available space rather than accumulate, as a leak from a liquid usually will. A gas may be colorless, odorless, or both, and more difficult to detect. A gas vacuum leak may be yet more difficult to detect for the reasons mentioned above.

Finding and repairing one or more gas leaks in an engine can return an engine to optimal performance. Finding and repairing one or more gas leaks in an engine in a short period of time can return an engine to optimal performance in a short period of time.

Silicone-based compositions are known in general for sealing liquid leaks. Silicone-based compositions are materials used to prepare gaskets for engines, including oil pan gaskets and engine head gaskets. Silicone room temperature vulcanizate (RTV) compositions are used in a variety of applications, including engine-type applications. Silicone-based "form-in-place" gaskets for engines exist.

Silicone-based materials have been used to seal positive pressure liquid leaks in some applications. Silicone-based materials are known to exhibit relatively high contact angles with surfaces relative to other types of materials. There exists a need for other materials to seal engine gas leaks.

BRIEF SUMMARY

The invention is a method of repairing at least one gas leak in an engine.

A first aspect, the invention provides a method comprised of (1) locating at least one gas leak in an engine, (2) applying an alkyl polyether composition and a crosslinking composition to at least one surface of the engine within three inches of the located gas leak; allowing a polyether dental impression material to form by reacting the alkyl polyether composition and the crosslinking composition; and (4) allowing the formed polyether dental impression material to seal the located gas leak. In a second aspect, an alkylpolyether composition and a crosslinking composition may be applied to the engine separately. In a third aspect, the invention provides applying an adhesive composition within three inches of a located gas leak and applying the polyether dental impression material on top of the adhesive.

In a fourth aspect, the alkyl polyether composition used in the polyether dental impression material of the general formula $(L)_x$-$[G$-$Q$-$E$-$NCH_2CHR]_y$. The —$NCH_2CHR$ group is an aziridine group. R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl; or R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F; or R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and up to five carbon atoms on R is each replaced by any of O, CO, N, and S; or R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F and up to five carbon atoms on R is each replaced by any of O, CO, N, and S; E is a $C_1$-$C_{18}$ branched or un-branched hydrocarbon chain wherein up to five carbon atoms in the chain is each replaced by any of O and CO; G is at least one of C(O)O, C(O)NR, C(O), C(O)C(O), C(O)(CH$_2$)$_m$C(O), C(S)NR, and —CH$_2$—, wherein m is in the range of 1 to 10; Q is at least one of (—OCH$_2$CH$_2$—)$_n$ or (—OCH$_2$CH(CH$_3$)—)$_n$, wherein n has an average value of 3 to 200; L is selected from the group consisting of O, S, and NR; x has a value of 0 or 1; and y is at least 1.

In a fifth aspect, the invention provides that the crosslinking composition of the dental impression material is of the general formula $R^1S(O)_2NHR^3R^1$ is at least one of $C_1$-$C_{22}$ alkyl, $C_2$-$C_{12}$ alkenyl, $C_2$-$C_{22}$ alkynyl, $C_7$-$C_{22}$ arylakyl or $C_3$-$C_{22}$ cycloalkyl; or $R^1$ is at least one of $C_1$-$C_{22}$ alkyl, $C_2$-$C_{12}$ alkenyl, $C_7$-$C_{22}$ arylalkyl or $C_3$-$C_{22}$ cycloalkyl and one or more hydrogen atoms on $R^1$ is each replaced by Cl or F; or $R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and up to five carbon atoms on $R^1$ is each replaced by any of O, CO, N, and S; or $R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and up to five carbon atoms on is each replaced by any of O, CO, N, and S and one or more hydrogen atoms on $R^1$ is each replaced by Cl or F; and $R^3$ is the same as $R^1$ or $R^2$ $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl, or $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and one or more hydrogen atoms on $R^2$ is each replaced by Cl or F; or $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and up to five carbon atoms on $R^2$ is each replaced by any of O, CO, N, and S; or $R^2$ is at least one of $C_6$-$C_{18}$ aryl, $C_7$-$C_{22}$ cycloalkylaryl, or $C_7$-$C_{22}$ alkynyl aryl and one or more hydrogen atoms on $R^2$ is each replaced by Cl or F and up to five carbon atoms on $R^2$ is each replaced by any of O, CO, N, and S.

In a sixth aspect, the crosslinking composition of the dental impression material is of the general formula $R^1S(O)_2NHR^1$.

In a seventh aspect, the crosslinking composition of the dental impression material is of the general formula $R^2S(O)_2NHR^3$. $R^3$ may be any of $R^1$ or $R^2$.

In an eighth aspect, the crosslinking composition of the dental impression material is of the general formula $R^3S(O)_2NHR^3$, $R^3$ may be any of $R^1$ or $R^2$. In a ninth aspect of the invention, the crosslinking composition is of the general formula $[R^4S(O)_2N]_a(R^5)_b$. $R^5$ is any suitable monomer known to those skilled in the art capable of polymerizing and bearing at least two sulfonic acid amide moieties along the polymer chain, preferably spaced apart rather than closer together along the polymer chain. $R^4$ may be any of $R^1$ or $R^2$ and "a" be at least 2 and b may have an average value between 20 and 200.

In a tenth aspect of the invention, at least one gas leak in an engine is located and a dental impression material is applied within three inches of the located leak while the engine manifold pressure is being monitored. The steps of locating engine gas leaks and sealing them with a premixed dental impression material can be repeated as many times as necessary while monitoring engine pressure until the engine maintains a pressure of at least 5 psi, or lower, when the engine throttle is at least 90% open.

In an eleventh aspect of the invention, the dental impression material is not pre-mixed. Rather, the alky polyether composition and the crosslinking compositions are placed only in partial contact with each other and then applied to an engine within three inches of a located gas leak in order to seal the gas leak.

In a twelfth aspect of the invention, the alkyl polyether composition is applied to at least a first engine surface within three inches of a located gas leak in an engine and a crosslinking composition is applied to at least a second engine surface within three inches of the located gas leak, and the first surface and the second surface are placed in at least partial contact with each other to cause at least partial contact between the alkyl polyether composition and the crosslinking composition so as to at least partially form a dental impression material that seals at least one leak in an engine. The aforementioned steps may be repeated as many times as necessary to seal a sufficient number of gas leaks in an engine for the engine to maintain at least 5 psi pressure, or lower, when the throttle position is at least 90% open.

In a thirteenth aspect of the invention, the alkyl polyether composition is a shapeable paste and the crosslinking composition is a shapeable paste. The alkyl polyether shapeable paste is formed into a shape and the crosslinking composition shapeable paste is formed into a shape. The two shapes are placed in at least partial contact with each other. The partially contacted shapes are applied within three inches of located engine gas leaks to seal the leaks.

In a fourteenth aspect of the invention, a barrier film is placed between the shapes of the thirteenth aspect of the invention described above. A portion of the shaped pastes separated by the barrier film is placed on a hot engine, causing the barrier film to be removed by melting. The shapes at least partially intermingle to form a dental impression material capable of sealing a located gas leak in an engine.

In a fifteenth aspect of the invention, at least one of the alkyl polyether composition and the crosslinking composition is additionally comprised of a retarder.

In a sixteenth aspect of the invention, at least one of the alkyl polyether composition and the crosslinking composition is additionally comprised of an accelerator.

In a seventeenth aspect, the invention is at least one gas leak seal in an engine formed by the method of locating at least one gas leak in an engine, applying one or more compositions comprising a polyether dental impression material to at least one surface of the engine within three inches of the located gas leak wherein the polyether dental impression material is comprised of an alkyl polyether composition and a crosslinking composition and the polyether dental impression material is allowed to at least partially react to form a polyether dental impression material on the engine and the polyether dental impression material so formed seals at least one located gas leak in the engine.

In an eighteenth aspect, the invention is at least one gas leak seal in an engine formed by the method of locating at least one gas leak in an engine, applying a polyether dental impression material prepared by pre-mixing an alkyl polyether and a crosslinking composition and applying the polyether dental impression material to at least one surface of the engine within three inches of the located gas leak wherein the polyether dental impression material forms at least one seal in the engine.

In a nineteenth aspect, the invention is at least one gas leak seal in an engine formed by the method of locating at least one gas leak in an engine and applying a shaped crosslinking composition and a shaped alkyl polyether composition separated by a removable barrier film, as in the fourteenth aspect of the invention, to at least one surface of an engine within three inches of a located leak.

In a twentieth aspect, the invention is the method of repairing an engine comprised of locating at least one gas leak in an engine, applying at least one composition comprising a polyether dental impression material to at least one surface of the engine within three inches of the located gas leak, allowing the composition or compositions to react to form a polyether dental impression material, and to seal the located gas leak, performing the steps above as many times as necessary to allow the engine to be used in at least one race, and the polyether dental impression material is comprised of at least an alkyl polyether composition and a crosslinking composition wherein the alkyl polyether the alkyl polyether is comprised of the formula (L)x-[G-Q-E-NCH$_2$CHR]$_y$; R is at least one of H, $C_1$-$C_{12}$, alkyl, $C_2$-$C_{12}$, alkenyl, $C_2$-$C_{12}$ alkynyl, $C_7$-$C_{15}$ arylaklyl, or $C_3$-$C_{12}$ cycloalkyl; or R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F; or R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and up to five carbon atoms on R is each replaced by any of O, CO, N, and S; or R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F and up to five carbon atoms on R is each replaced by any of O, CO, N, and S; E is a $C_1$-$C_{18}$ branched or un-branched hydrocarbon chain wherein up to five carbon atoms in the chain is each replaced by any of O and CO; G is at least one of C(O)O, C(O)NR, C(O), C(O)C(O), C(O)(CH$_2$)$_m$C(O), C(S)NR, and —CH$_2$—, wherein m is in the range of 1 to 10; Q is at least one of (—OCH$_2$CH$_2$—)$_n$ or (—OCH$_2$CH(CH$_3$)—)$_n$, wherein n has an average value of 3 to 200; L is selected from the group consisting of O, S, and NR; x has a value of 0 or 1; and y is at least 1; the crosslinking composition is comprised of a compound with the formula $R^1S(O)_2NHR^3$ or $R^2S(O)_2NHR^3$ or $[R^4S(O)_2N]_a(R^5)_b$ wherein; $R^1$ is at least one of $C_1$-$C_{22}$ alkyl, $C_2C_{12}$ alkenyl, $C_2$-$C_{22}$ alkynyl, $C_7$-$C_{22}$ arylalkyl or $C_3C_{22}$ cycloalkyl, or $R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and one or more hydrogen atoms on $R^1$ is each replaced by Cl or F; or $R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and up to five carbon atoms on $R^1$ is each replaced by any of O, CO, N, and S: or $R^1$ is at least one of $C_1$-$C_{22}$ alkyl, $C_2$-$C_{22}$ alkenyl, $C_2$-$C_{22}$ alkynyl, $C_7$-$C_{22}$ arylalkyl or $C_3$-$C_{22}$ cycloalkyl and up to five carbon atoms on $R^1$ is each replaced with any of O, CO, N, and S and one or more hydrogen atoms on $R^1$ is each replaced by Cl or F; $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl, or $R^2$ is at least one of $C_6$-$C_{18}$ aryl, $C_7$-$C_{22}$ alkylaryl, $C_2$-$C_{22}$ cycloalkylaryl, or $C_1$-$C_{22}$ alkynyl aryl, and one or more hydrogen atoms on $R^2$ is each replaced by Cl or F; or $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and up to five carbon atoms on $R^2$ is each replaced by any of O, CO, N, and S; or $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and one or more hydrogen atoms on $R^2$ is each replaced by Cl or F and up to five carbon atoms on $R^2$ is each replaced by any of O, CO, N, and S; $R^3$ is $R^1$ or $R^2$; $R^4$ is $R^1$ or $R^2$; $R^5$ is —$CH_2$— or —$OCH_2CH_2$— or —$OCH_2CH_2(CH_3)$—; a is at least 2; and b has an average value between 20 and 200.

In a twenty-first aspect, the invention is as described in the twentieth aspect and further comprises monitoring the engine manifold pressure while applying the dental impression material or components of the dental impression material and repeating the aforementioned steps as many times as necessary to cause the engine manifold pressure to drop to at least 5 psi when the engine throttle is at least 90% open.

In a twenty-second aspect, the invention is as described in the twentieth aspect above and is additionally using a pre-mixed dental impression material.

In a twenty-third aspect, any of the preceeding aspects involving the step of locating at least one gas leak employs a hydrocarbon-mist leak detector to locate at least one gas leak in an engine.

In twenty-fourth aspect, monitoring of at least one located gas leak in an engine is made using a hydrocarbon-mist leak detector in order to determine when a dental impression material has sealed a leak.

BRIEF DESCRIPTION OF THE DRAWINGS

FIG. 3 is an alternative general chemical structure of an embodiment of a crosslinking composition.

FIG. 5 depicts the general process steps for sealing at least one gas leak in an engine.

DETAILED DESCRIPTION

Figure 1:
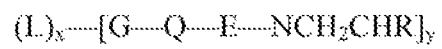
FIG. 1 is the general chemical structure of an embodiment of an alkyl polyether composition.

For the purposes of this disclosure, the following terms have the following meanings in this application:

"Atmospheric Pressure" means pressure caused by the weight of the atmosphere, which at sea level, has a mean value of approximately 14.7 psi [1 atmosphere] but reduces with increasing altitude.

"Gas" means a substance which, at standard temperature and pressure, is in the state of matter distinguished from the solid and liquid states by relatively low density and viscosity, relatively great expansion and contraction with changes in pressure and temperature, the ability to diffuse readily, and the spontaneous tendency to become distributed uniformly throughout any container. A substance in the gaseous state.

"Gas leak" means the passage or escape of a gas through a breach or flaw.

"Fluid means" a gas or liquid at standard temperature and pressure.

"Leak," when used as a noun, means the passage or escape of a fluid through a breach or flaw.

"Liquid" means the state of matter in which a substance exhibits a characteristic readiness to flow, little or no tendency to disperse, and relatively high incompressibility at standard temperature and pressure.

"Paste," when used as a noun, means a soft, smooth, thick mixture or material, capable of retaining dimensions imposed upon it at a specified temperature and pressure.

"Pneumatic communication" means that two gas-containing regions are connected to one another in such a way that air or a gas may flow in one or both directions between such regions.

"Seal," when used as a noun, means a device to substantially prevent the passage or return of a fluid from one area to another.

"Seal," when used as a verb, means to substantially prevent the passage or return of a fluid from one area to another.

"Shapeable" means capable of retaining conformity to a particular form or pattern upon the application of an external force at a specified temperature and pressure.

"Standard Temperature and Pressure" means 14.7 psi [one atmosphere] of pressure and 77 degrees Fahrenheit [25 degrees Centigrade].

"Throttle Position" means the position of the valve in an engine throttle, usually expressed as a percentage open or a percentage closed, that regulates in the amount of air pulled into an engine. When the throttle position is expressed as 100% closed, the engine is essentially at idle. When the throttle position is 100% open, the engine manifold system pulls air into the air intake manifold using the maximum amount of available vacuum to increase air flow into the engine.

"Vacuum," when used as a noun, means a space which may contain air or other gas at a reduced pressure relative to atmospheric pressure.

"Vicinity of a gas leak in an engine" means anywhere on or in an engine within three inches of a gas leak in that engine.

For the purposes of this disclosure, unless otherwise indicated, the following physical measurements are in the following units:

Pressure is measured in pounds per square inch and abbreviated "psi." Pressure may be positive or negative (vacuum). Temperature is measured in degrees Fahrenheit.

Unless otherwise noted, ratios and percentages in mixtures are expressed in relative weights.

Referring to FIG. 5, a method of sealing one or more gas leaks in an engine is generally comprised of locating at least one gas leak in the engine and using the components of a polyether dental impression material to form a polyether dental impression material by reacting an alkylpolyether composition and a crosslinking composition and applying the polyether dental impression material within three inches of at least one gas leak so that the polyether dental impression material seals at least one gas leak. Any type of gas leak in an engine may be located and sealed. Some gas leaks may be positive pressure. Other gas leaks may be negative pressure (vacuum). Some gas leaks in an engine may form in portions of an air intake system. Other gas leaks in an engine may form in or around the engine head. Some gas leaks are so small as to be undetectable with human senses, yet one or more of gas leaks may express itself in sub-optimal engine performance and be subject to detection by methods known to those skilled in the art of engine mechanics.

In one embodiment, the components of a polyether dental impression material may be pre-mixed and then applied within three inches of a gas leak. The polyether dental impression material may be pre-mixed with any apparatus and by any method known to those skilled in the 14 art. Mixing can be achieved manually using the hands or other handtools as in U.S. Pat. No. 783,857, herein incorporated by reference. A mixing device can be used as it is described in EP 0492413 B1, herein incorporated by reference, and available on the market as PENTAMIX™ or PENTAMIX™ 2 or PENTAMIX™ 3 mixers. Another example of a mixing apparatus known to those skilled in the art is a PENTA™ mixing cannula as used in a PENTAMIX™ Mixing Unit Device. Yet another example of a mixing apparatus known to those skilled in the art is a double planetary mixer as described in U.S. Pat. No. 5,286,105, herein incorporated by reference. Yet other examples of mixing and dispensing devices include those available from THREE BOND INTERNATIONAL, INC., such as the THREE BOND™ High Viscosity Dispenser and the THREE BOND™ High Velocity Dispenser, or a THREE BOND™ 2 Part Epoxy Resin Dispenser.

In another embodiment, an alkyl polyether composition comprising a polyether dental impression material may be placed on one surface of an engine within three inches of a located gas leak and the crosslinking composition comprising a polyether dental impression material may be placed on another surface of an engine within three inches of the located gas leak and the alkyl polyether composition and the crosslinking composition on the respective engine surfaces may be brought into contact to form a dental impression material capable of sealing the located engine gas leak. In yet another embodiment, the alkyl polyether composition comprising a polyether dental impression material may be placed on one surface of an engine within three inches of a located gas leak and the crosslinking composition comprising a polyether dental impression material may be placed on top of the alkyl polyether composition and then a second engine surface within three inches of an engine gas leak may be brought into contact with the contacted alkyl polyether and crosslinking compositions to form a dental impression material capable of sealing a located engine gas leak. In yet another embodiment, the crosslinking composition comprising a polyether dental impression material may be placed on one surface of an engine within three inches of a located gas leak and the alkyl polyether composition comprising a polyether dental impression material may be placed on top of the crosslinking composition and then a second engine surface within three inches of a located engine gas leak may be brought into contact with contacted crosslinking and polyether compositions to form a dental impression material capable of sealing the located engine gas leak.

In another embodiment, a shapeable alkyl polyether composition comprising a polyether dental impression material is formed into a first shape; a shapeable crosslinking composition is formed into a second shape. The respective shaped compositions are placed in at least partial contact and applied within three inches of a located engine gas leak. In yet another embodiment, the respective shaped compositions may be separated by a removable barrier film.

In one embodiment, an alkyl polyether composition and a crosslinking composition comprising a polyether dental impression material are applied by hand to at least one located gas leak in an engine. In another embodiment, an alkyl polyether composition and a crosslinking composition comprising a polyether dental impression material may be applied to at least one located gas leak in an engine using a PENTA™ Elastomer Syringe available from 3M ESPE.

In some embodiments, the alkyl polyether composition and crosslinking composition are mixed by hand and the resulting mixture is applied by hand to at least one located gas leak in an engine. In other embodiments, the alkyl polyether composition and crosslinking composition forming the polyether dental impression material are first mixed by hand and then applied by syringe, or by any other method known to those skilled in the art.

In some embodiments, the vicinity of a gas leak on the engine does not require any treatment with an adhesive composition before application of the components of a dental impression material or of the dental impression material in order to seal a gas leak. In other embodiments, an adhesive composition may be applied to the vicinity of a gas leak on the engine. In some embodiments, a polyether composition and a crosslinking composition may be applied within three inches of a gas leak on the engine on top of the adhesive composition. In yet other embodiments, the polyether composition and the crosslinking composition may be pre-mixed and applied on top of the adhesive composition applied to the vicinity of a gas leak on the engine. Any adhesive known to those skilled in the art may be used. In one embodiment using an adhesive, the adhesive is 3M ESPE Polyether Adhesive. In another embodiment using an adhesive pre-treatment, the adhesive is 3M ESPE Tray Adhesive. Both adhesives are available from 3M ESPE.

In some embodiments, the ratio of alkyl polyether composition to crosslinking composition may be between 40:1 to 1:10. In other embodiments, that ratio may be 30:1 to 1:5. In still other embodiments, that ratio may be 20:1 to 1:1. In further embodiments, that ratio may be 10:1 to 5:1.

In some embodiments, the ratio of alkyl polyether composition to crosslinking composition may be measured as in U.S. Pat. No. 7,838,572, including measurement by sight from strand-length comparison. In other embodiments, the ratio may be may be pre-dosed, as with pre-dosed packaging units used to make dental impressions. Some examples of pre-dosed packages used to make dental impressions from polyether compositions and crosslinking compositions suitable for use in sealing at least one located gas leak in an engine include IMPREGUM™ PENTA™ and GARANT™ product lines of pre-dosed packages used to make dental impression materials. Both product lines are available from 3M ESPE.

Embodiments using the pre-dosed packages for making dental impression materials capable of sealing a gas leak in an engine from the IMPREGUM™ PENTA™ product line include: IMPREGUM™ PENTA™ SOFT MEDIUM BODY IMPRESSION MATERIAL, IMPREGUM™ PENTA™ SOFT HEAVY BODY IMPRESSION MATERIAL, IMPREGUM™ PENTA™ SOFT LIGHT BODY IMPRESSION MATERIAL.

Other embodiments using the pre-dosed packages for making dental impression materials capable of sealing a gas leak in an engine include IMPREGUM™ GARANT™ SOFT LIGHT BODY IMPRESSION MATERIAL, IMPREGUM™ GARANT™ SOFT HEAVY BODY IMPRESSION MATERIAL. All materials are made by 3M ESPE and available from Patterson Dental). A copy of IMPREGUM™ PENTA™ SOFT Heavy Body/Light Body/Medium Body Impression Material Technical Product Profile, is provided with this application and herein incorporated by reference.

The dental impression material is generally comprised of at least an alkyl polyether composition and a crosslinking composition. FIG. 1 represents one embodiment of the general structure of an alkyl polyether composition. Some examples of general structure of FIG. 1, known to those skilled in the art, may be found in U.S. Pat. No. 7,838,572. One method of preparing alkyl polyethers is disclosed in U.S. Pat. No. 3,453,242, herein incorporated by reference.

In some embodiments of the general structure of FIG. 1, L can be O, S, NHR, or NR depending upon the value of x. In some embodiments x can be zero. In yet other embodiments x can be 1. In some embodiments, y can be 1. In other, more preferred embodiments, y can be 2. In yet even more preferred embodiments, x can be 1 and y can be 2.

In some embodiments, the $NCH_2CHR$ group in FIG. 1 is an aziridine group. In some preferred embodiments, y=2, and x=1. Still referring to FIG. 1, various embodiments of the alkyl polyether composition include those wherein R is at least one of H, $C_1$-$C_{12}$ alkyl, $C_2$-$C_{12}$, alkenyl, $C_2$-$C_{12}$ alkynyl, $C_7$-$C_{15}$ alkylylated aryl, or $C_3$-$C_{12}$ cycloalkyl. In some embodiments, R may be at least one of H, $C_1$-$C_{12}$ alkyl, $C_2$-$C_{12}$ alkenyl, $C_2$-$C_{12}$ alkynyl, $C_7C_{15}$ aarylaklyl, or $C_3$-$C_{12}$ cycloalkyl and one or more hydrogen atoms on R is each replaced by Cl or F; or R may be at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and up to five carbon atoms on R is each replaced by any of O, CO, N, and S; or R may be at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F and up to five carbon atoms on R is each replaced by any of O, CO, N, and S.

Still referring to FIG. 1, E can be a $C_1$-$C_{18}$ branched or un-branched hydrocarbon chain wherein up to five carbon atoms in the chain is each replaced by any of O and CO.

Figure 2:
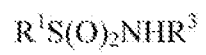
FIG. 2 is the general chemical structure of an embodiment of a crosslinking composition.
Figure 4:
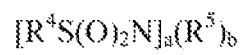
FIG. 4 depicts yet another alternative general chemical structure of an embodiment of a crosslinking composition.

FIGS. 2-4 represent some embodiments of the general structure of a crosslinking composition. Examples of the general structures of FIG. 2 and FIG. 3 may be found in U.S. Pat. No. 7,838,572. The crosslinking compositions of the general types depicted in FIGS. 2-4 may be synthesized by any method known to those skilled in the art. In general, sulfonamides of the type depicted in FIGS. 2-4 may be prepared as described in the following references: (1) "$KF/Al_2O_3$ as an Efficient, Green, and Reusable Catalytic System for the Solvent-Free Synthesis of N-Alkyl Derivatives of Sulfonamides via Michael Reactions" Abdolkarim Zare, Alireza Hasaninejad, Mohammad Hassan Beyzavi, et. al in Phosphorus, Sulfur, and Silicon, 184:1702-1712, (2009) (Taylor & Francis Group, LLC); (2) "Rapid and Efficient Synthesis of Sulfonamides From Sulfonic Acid and Amines Using Cyanuric Chloride-DMF Adduct," Shivaji S. Pandit, Vishal U. Pandit and Babasaheb P. Bandgarc, Journal of Sulfur Chemistry® 29(6), 619-622 (December 2008) (Taylor & Francis Group, LLC); (3) "Convenient One-Pot Synthesis of Sulfonamides from Thiols using Trichloroisocyanuric Acid," Jason D. Bonk, David T. Amos, and Sarah J. Olson, Synthetic Communications, 37: 2039-2050, (2007) (Taylor & Francis Group, LLC); each herein incorporated by reference.

Referring to FIG. 2 and FIG. 3 depicting different embodiments of crosslinking compositions, in some embodiments, $R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl. In some embodiments, $R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and one or more hydrogen atoms on $R^1$ is each replaced by Cl or F; or $R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and up to five carbon atoms on $R^1$ is each replaced by any of O, CO, N, and S; or $R^1$ is at least one of $C_1$-$C_{22}$ alkyl, $C_2$-$C_{12}$ alkenyl, $C_2C_{22}$ alkynyl, $C_7$-$C_{22}$ arylalkyl or $C_3$-$C_{22}$ cycloalkyl and up to five carbon atoms on is each replaced by any of O, CO, N, and S and one or more hydrogen atoms on $R^1$ is each replaced by Cl or F; and $R^3$ is the same as $R^1$ or $R^2$, $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl, or $R^2$ is at least one of $C_6$-$C_{18}$ aryl, $C_7$-$C_{22}$ alkylaryl, $C_2$-$C_{22}$ cycloalkylaryl, or $C_2$-$C_{22}$ alkynyl aryl and one or more hydrogen atoms on $R^2$ is each replaced by Cl or F; or $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and up to five carbon atoms on $R^2$ is each replaced by any of O, CO, N, and S; or $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and one or more hydrogen atoms on $R^2$ is each replaced by Cl or F and up to five carbon atoms on $R^2$ is each replaced by any of O, CO, N, and S.

Still referring to FIG. 2 and FIG. 3, in some embodiments of the general the general structures depicted in FIG. 2 and FIG. 3, In some embodiments, $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl, or $R^2$ is at least one of $C_a$-$C_{18}$ aryl, $C_7$-$C_{22}$ alkylaryl, $C_2$-$C_{22}$ cycloalkylaryl, or $C_7$-$C_{22}$ alkynyl aryl and one or more hydrogen atoms on $R^2$ is each replaced by Cl or F; or $R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and up to five carbon atoms on $R^2$ is each replaced by any of O, CO, N, and S; or $R^2$ is a least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and one or more hydrogen atoms on $R^2$ is each replaced by Cl or F and up to five carbon atoms on $R^2$ is each replaced by any of O, CO, N, and S.

Still referring to both FIG. 2 and FIG. 3, in some embodiments, $R^3$ may be $R^1$. In other embodiments, the R groups may be the same. In yet other embodiments, the R groups may be different.

Now referring to FIG. 4, yet another embodiment of a crosslinking composition may include a polymeric version of the crosslinking compositions of FIG. 2 or FIG. 3. $R^5$ may be any suitable monomer known to those skilled in the art capable of polymerizing and bearing at least two sulfonic acid amide moieties along the polymer chain, preferably spaced apart rather than closer together along the polymer chain. In some embodiments, $R^5$ may (—$CH_2$—). In other embodiments, $R^5$ may (—$OCH_2CH_2$—). In yet other embodiments, $R^5$ may (—$OCH_2CH(CH_3)$—). Still referring to FIG. 4, the value of b may be any value known to those skilled in the art to provide the desired consistency of the dental impression material. In some embodiments, the average value of b is at least 20. In other embodiments, the average value of b is between 21 and 200. In some embodiments, $R^4$ may be any of $R^1$ or $R^2$.

One method of synthesizing compounds of the general structure in FIG. 4 is by polymerization of the vinyl compounds and their unprotected derivatives as prepared in "Synthesis and Catalysed Hydroboration of Styryl Sulfonamides," Natalie A. Wynberg, Lisa J. Leger, Maren L. Conrad, et. al., Can. J. Chem. 83: 661-667 (2005) (NRC Canada), herein incorporated by reference. Deprotection, polymerization, or both may be effected by any method known to those skilled in the art. Most preferably, polymerization may be effected in a suitable solvent under an inert atmosphere with initiation as needed.

In some embodiments of the dental impression material formed from the alkyl polyether composition and the crosslinking composition used to seal a gas leak in an engine, either the alkyl polyether composition or the crosslinking composition, or both compositions may additionally comprise fillers, oils, accelerators, retarders, surfactants and other components known to those skilled in the art.

Examples of fillers include sand, glass or ceramic microbeads, hollow glass, ceramic or polymeric microspheres. Other examples of fillers include ground rubber, recycled rubber, or other recycled materials such as paper, paper pulp, cork, nut hulls, corn cobs and the like. Yet other examples of fillers include carbon black, carbon nanotubes and nanostructured ceramic materials. Still other examples of fillers include silica, silicic acids, fumed silica, quartz powders, quartz flour, metal oxides, iron oxide, zinc oxide, titanium oxide, micronized titanium oxide, aluminum oxide, metal carbonates, calcium carbonate, micronized calcium carbonate, magnesium carbonate, zinc carbonate, metal sulfates, calcium sulfate, barium sulfate, mica powder and diatomaceous earth. Other examples of fillers include fibers, ribbons or other high-aspect ratio particles. Still other fillers include nano-structured clays.

Any of the aforementioned fillers may be additionally surface-treated. Some additional examples of surface-treated fillers include tri-glyceride treated silica or acid-treated silica. Treatments for fillers include the use of low molecular weight fatty acids, surfactants, or treatment with silanizing agents such as hexamethyldisilazine, chlorotrimethyl siloxane or vinyl- or amino-siloxanes.

In some embodiments, filler material may comprise up to 20% of either the alkylpolyether composition or the crosslinking composition or both. In other embodiments, the filler material may comprise up to 15% of the alkyl polyether composition or the crosslinking composition or both. In still other embodiments, the filler material may comprise up to 10% of the alkyl polyether composition or the crosslinking composition or both. In further embodiments, the filler material may comprise up to 5% of the alkyl polyether composition or the crosslinking composition or both.

In some embodiments, the alkyl polyether composition or the crosslinking composition or both compositions are further comprised of oils. In some embodiments, the oil is a branched chain alcohol ester. In other embodiments, the oil is a polycarbonate. In still other embodiments, the oil is a polyolefin, more preferably, a poly-alpha-olefin (PAO).

In other embodiments, the oil may include oxygenated moieties including oxygenated $C_{12}$-$C_{20}$ linear and branched chain hydrocarbons and hydrocarbon acid esters. In even other embodiments, the oil is a polyolefin ester. In yet more embodiments, the oil may be a $C_{12}$-$C_{15}$ alkyl acetate, or a liquid derivative of a citric acid or ester, or a branched-chain phthalic acid esters made from a branched chain alcohol. An example of a branched-chain alcohol is 2-ethyl-hexyl alcohol. In further embodiments, the oil may be comprised of mixtures of the aforementioned oils.

In some embodiments, oils may comprise up to 45% of an alkyl polyether composition, or of a crosslinking composition, or of both compositions. In other embodiments, oils may comprise up to 40% of an alkyl polyether composition, or of a crosslinking composition or of both compositions. In still other embodiments, oils may comprise up to 35% of an alkyl polyether composition, or of a crosslinking composition, or of both compositions. In further embodiments, oils may comprise up to 30% of an alkyl polyether composition, or of a crosslinking composition, or of both compositions. In yet more embodiments, oils may comprise up to 20% of an alkyl polyether composition, or of a crosslinking composition, or of both compositions. In other embodiments, oils may comprise up to 15% of an alkyl polyether composition, or of a crosslinking composition, or of both compositions.

In general, embodiments of accelerators are organic acids as described in U.S. Pat. No. 3,453,242 herein incorporated by reference. In some embodiments, no accelerator is required. In other embodiments, an accelerator may be added to either the alkyl polyether composition or to the crosslinking compositions. In other embodiments, the accelerator may be added to both compositions. Most preferably, any accelerator is added to the crosslinking composition. In one embodiment, the accelerator is a sulfonic acid or sulfonic acid derivative. One example of a sulfonic acid is benzene sulfonic acid. Another example of a sulfonic acid is p-toluene-sulfonic acid. One example of a sulfonic acid derivative is the methyl-ester of p-toluene-sulfonic acid. In other embodiments, the alkyl group of the sulfonic acid ester may be $C_4$ to $C_{20}$. In yet other embodiments, the accelerator may be a sulfamic acid or sulfamic acid derivative. In further embodiments, the accelerator is a carboxylic acid or derivative, including halogenated derivatives. In some embodiments, the amount of accelerator used is up to 5% of the amount of an alkyl polyether composition, or of a crosslinking composition, or of the combination of an alkyl polyether composition and a crosslinking composition. In other embodiments, the amount of accelerator used is up to 1.5% of the amount of an alkyl polyether composition, or of a crosslinking composition, or of the combination of an alkyl polyether composition and a crosslinking composition.

In some embodiments, no retarder is added. In other embodiments, a retarder may be added to either the alkyl polyether composition or the crosslinking composition. In yet other embodiments, a retarder may be added to both compositions. In some embodiments, the retarder may be epinephrine (adrenaline). In other embodiments, the retarder may be 8-hydroxyquinoline sulphate. In yet other embodiments, the retarder may be $Fe_2(SO_4)_2$. In further embodiments, the retarder may be imidazole or an imidazole derivative. In some embodiments, the amount of retarder used is up to 5% of the amount of an alkyl polyether composition, or of a crosslinking composition, or of the combination of an alkyl polyether composition and a crosslinking composition. In other embodiments, the amount of retarder used is up to 1.5% of the amount of an alkyl polyether composition, or of a crosslinking composition, or of the combination of an alkyl polyether composition and a crosslinking composition.

In some embodiments, the alkyl polyether composition and the crosslinking composition are each in the form of shapeable pastes. In one embodiment, each shapeable paste is formed and placed in contact with the other. The contacted pastes may be applied by hand to a located leak. In another embodiment, the shapeable compositions are separated by a low-melting barrier film. One example of such a film is that made from the compositions described in U.S. patent, herein incorporated by reference.

In some embodiments, the step of locating at least one leak in an engine occurs before the polyether dental impression material or compositions comprising the polyether dental impression material are mixed, or shaped and contacted, or applied to an engine within three inches of a gas leak. In other embodiments, the steps of locating one or more gas leaks in an engine and forming a polyether dental impression material capable of sealing the leak occur at the same time, or substantially the same time in order to minimize the time required to seal a gas leak and return an engine to better operation than with a gas leak. Performing the steps of locating and sealing engine gas leaks nearly simultaneously is particularly advantageous when a race engine develops a leak and repair must be made within a very short period of time.

Locating a gas leak in an engine may be made my any method known to those skilled in the art. In some embodiments, a mist-generating device may be used to detect one or more gas leaks in an engine. In some embodiments, the mist generated for leak detection is a hydrocarbon mist. One example of a leak detector that uses a hydrocarbon mist is an ELF-1 automotive leak detector made by RTI and available from Automotive Service Equipment, LLC. Another example of a hydrocarbon mist-generating leak detector is Red Line Smoke Pro® Family of leak detection products available from Redline Detection, LLC).

In some embodiments, gas leak detector is used while the engine is running. In other embodiments, the gas leak is located while the engine is not running. In embodiments in which a gas leak is detected while the engine is not running, pressure or vacuum may be applied to the engine through the air intake manifold in order to detect a gas leak. In other embodiments, the pressure or vacuum may be applied through an engine exhaust manifold. In yet other embodiments, the pressure or vacuum may be applied through an engine cylinder head port.

Another example of a leak detector is a vacuum gauge.

In other embodiments, a gas leak in an engine is detected with a gauge. In some embodiments, the gauge is analog. In other embodiments the gauge is digital. In some embodiments, the gauge detects a positive pressure leak. In other embodiments, the gauge detects a vacuum (negative) pressure leak. In some embodiments, the leak is detected with the gauge while the engine is running. In other embodiments, the leak is detected while the engine is not running and an external pressure or vacuum source is applied to the engine. In some embodiments, the pressure or vacuum may be applied to the engine through the air intake manifold. In other embodiments, the pressure or vacuum may be applied through an engine exhaust manifold. In yet other embodiments, the pressure or vacuum may be applied through an engine cylinder head port. Other methods known to those skilled in the art for detecting vacuum or pressure leaks may be used. For example, the carburetor cleaner method known to those skilled in the art of engine mechanics may also be used.

In a most-preferred embodiment, a hydrocarbon mist-generating gas leak detector is employed to detect one or more engine gas leaks while the engine is running and during the process sealing one or more leaks by applying a dental impression material or the components of a dental impression material within three inches of a gas leak in an engine.

In some embodiments, the alkyl polyether composition and the crosslinking composition or the pre-mixed dental impression material may be applied to the positive pressure side of a gas leak in an engine. In other embodiments, the alkyl polyether composition and the crosslinking composition may be applied to a vacuum side of a gas leak in an engine.

In some embodiments, the alkyl polyether composition and the crosslinking composition or the premixed dental impression material may be applied to a relatively cool engine surface. In other embodiments, the temperature of the surface of an engine within three inches of a gas leak may be up to 200 degrees Fahrenheit. In other embodiments, the aforementioned temperature may be up to 180 degrees Fahrenheit. In further embodiments, the aforementioned temperature may be up to 160 degrees Fahrenheit.

In some embodiments, the alkyl polyether composition and the crosslinking composition or the pre-mixed dental impression material may be applied to a hot engine surface. In a preferred embodiment, the alkyl polyether composition and the crosslinking composition are applied to a hot engine surface or surfaces within three inches of one or more engine vacuum gas leaks while the engine is running and concurrent with gas leak detection with a hydrocarbon mist-generating leak detector. Although those skilled in the art would question the stability of a dental impression material on a hot engine, the materials serve the purpose of sealing a leak for at least one race.

EXAMPLES

Example 1

In a stirred reaction vessel equipped with a distillation apparatus, a mixture of 90.1 g hexamethylene glycol, 177.6 g 1,6-hexane diol, 40.5 g sebacic acid and 263.1 g adipic acid is heated with stirring under nitrogen to 150 degrees Centigrade. (All chemicals may be purchased from Sigma-Aldrich Chemical Company). The reaction mixture is stirred for one hour at 150 degrees Centigrade as water is removed from the reaction with the distillation apparatus. With continued stirring under nitrogen, 67 g of crotonic anhydride is added slowly and the temperature of the reaction is increased to 180-185 degrees Centigrade for up to an additional two hours. As the reaction with crotonic anhydride proceeds, crotonic acid may be removed using the distillation apparatus. Excess unreacted crotonic anhydride may be stripped from the reaction mixture by vacuum distillation at about 5 psi (10 mm Hg) pressure and about 58 degrees Centigrade temperature.

Example 2

In a stirred reaction vessel equipped with a distillation apparatus, a mixture of 180 g poly-ethylene oxide (approximate 2000 g/mol), 40.5 g sebacic acid and 263.1 g adipic acid is heated with stirring under nitrogen to 150 degrees Centigrade. The reaction mixture is stirred for one hour at 150 degrees Centigrade as water is removed from the reaction with the distillation apparatus. With continued stirring under nitrogen, 67 g of crotonic anhydride is added slowly and the temperature of the reaction is increased to 180-185 degrees Centigrade for up to an additional two hours. As the reaction with crotonic anhydride proceeds, crotonic acid may be removed using the distillation apparatus. Excess unreacted crotonic anhydride may be stripped from the reaction mixture by vacuum distillation at about 5 psi (10 mm Hg) pressure and about 58 degrees Centigrade temperature.

Example 3

A 50 g sample of the mixture prepared in Example 1 is heated to 55 degrees centigrade. Then, 8 g of ethylene imine is slowly added with stirring. Heat is removed from the reaction mixture, which is stirred continuously for an additional seven days. The resulting mixture is diluted with 250 ml of toluene and washed several times with water to remove any unreacted ethylene imine. The toluene phase is dried over anhydrous magnesium chloride. The toluene is stripped off using a rotary evaporator operating at a vacuum of approximately 30 mm Hg (approximately 0.5 psi).

Example 4

A 50 g sample of the mixture prepared in Example 2 is heated to 55 degrees Centigrade. Then, 8 g of ethylene imine is slowly added with stirring. Heat is removed from the reaction mixture, which is stirred continuously for an additional seven days. The resulting mixture is diluted with 250 ml of toluene and washed several times with water to remove any unreacted ethylene imine. The toluene phase is dried with anhydrous magnesium chloride. The toluene is stripped off a vacuum pressure of using a rotary evaporator operating at a vacuum of approximately 30 mm Hg (approximately 0.5 psi).

Example 5

Preparation of an alkyl polyether composition. 100 g of the reaction product from Example 3 is mixed with up to 60 g of ESTEREX™ P61 (available from ExxonMobil Chemical Company, Inc.) using a double planetary mixer to achieve a consistency of thick molasses at room temperature. To this mixture is added up to between 16-25 g of diatomaceous earth to obtain a shapeable paste roughly the consistency of stiff peanut butter.

Example 6

Preparation of an alkyl polyether composition. 100 g of the reaction product from Example 4 is mixed with up to 60 g of oil ESTEREX™ P61 (available from ExxonMobil Chemical Company,) using a double planetary mixer to achieve a consistency of thick molasses at room temperature. To this mixture is added up to between 16-25 g of diatomaceous earth to obtain a shapeable paste roughly the consistency of stiff peanut butter.

Example 6

Preparation of a crosslinking composition. A crosslinking composition is prepared as in "KF/Al2O3 as an Efficient, Green, and Reusable Catalytic System for the Solvent-Free Synthesis of N-Alkyl Derivatives of Sulfonamides via Michael Reactions" Abdolkarim Zare, Alireza Hasaninejad, Mohammad Hassan Beyzavi, et. al in Phosphorus, Sulfur, and Silicon, 184:1702-1712, (2009) Taylor & Francis Group, LLC). The starting materials can be as in Table IV, entry 6.

Example 7

Preparation of a crosslinking composition. N-phenyl-p-toluene sulfonamide may be prepared according to the method described in "Rapid and Efficient Synthesis of Sulfonamides From Sulfonic Acid and Amines Using Cyanuric Chloride-DMF Adduct," Shivaji S. Pandit, Vishal U. Pandit and Babasaheb P. Bandgar, Journal of Sulfur Chemistry® 29(6), 619-622 (December 2008) (Taylor & Francis Group, LLC), Table 1, entry 1.

Example 8

Preparation of a crosslinking composition. A polymeric crosslinking composition may be prepared by polymerizing a styrenic sulfonamide as prepared according to "Synthesis and Catalysed Hydroboration of Styryl Sulfonamides," Natalie A. Wynberg, Lisa J. Leger, Maren L. Conrad, et. al., Can. J. Chem. 83: 661-667 (2005) (NRC Canada). The resulting polymeric sulfonamide may be used to prepare a dental impression material by mixing with a suitable alkyl polyether composition, for example, the composition in Example 3, in an amount sufficient to form a dental impression material with the desired consistency.

Example 9

100 g of the reaction product of Examples 6, 7 or 8 may be diluted with up to 60 g of an ESTEREX™ oil, for example, ESTEREX™, to achieve a consistency of thick molasses at room temperature. To this mixture is added up to 30 g of diatomaceous earth to achieve a mixture with a consistency no greater than thick molasses. The resulting crosslinking compositions are CLC-1, CLC-2, and CLC-P, respectively.

Example 10

Preparation of a dental impression material. One chamber of a THREE BOND™ 2 Part Epoxy Resin Dispenser is filled with the alkyl polyether composition of Example 5. The other chamber of the dispenser is filled with the crosslinking composition CLC-1. The dispenser may be programmed to mix the alky polyether composition and the crosslinking composition together in any desired ratio. In this example, the ratio is 20 parts alkyl polyether composition to 1 part crosslinking composition. The ratio of the alkyl polyether composition and the crosslinking composition may be varied to achieve the desired consistency and pumpability of the resulting dental impression material. Within no more than three minutes of beginning to mix the alkyl polyether composition with the crosslinking composition, the resulting dental impression material is applied to one or more leaks in an engine. The dental impression material should harden to seal the engine leak within a few minutes.

Example 10

Preparation of a dental impression material. One chamber of a THREE BOND™ 2 Part Epoxy Resin Dispenser is filled with the alkyl polyether composition of Example 6. The other chamber of the dispenser is filled with the crosslinking composition CLC-P. The dispenser may be programmed to mix the alky polyether composition and the crosslinking composition together in any desired ratio. In this example, the ratio is 20 parts alkyl polyether composition to 1 part crosslinking composition. The ratio of the alkyl polyether composition and the crosslinking composition may be varied to achieve the desired consistency and pumpability of the resulting dental impression material. Within no more than three minutes of beginning to mix the alkyl polyether composition with the crosslinking composition, the resulting dental impression material is applied to one or more leaks in an engine. The dental impression material should harden to seal the engine leak within a few minutes.

Example 11

One chamber of a THREE BOND™ 2 Part Epoxy Resin Dispenser is filled with the alkyl polyether composition of Example 6. The other chamber of the dispenser is filled with the crosslinking composition CLC-2. The dispenser may be programmed to mix the alky polyether composition and the crosslinking composition together in any desired ratio. In this example, the ratio is 20 parts alkyl polyether composition to 1 part crosslinking composition. The ratio of the alkyl polyether composition and the crosslinking composition may be varied to achieve the desired consistency and pumpability of the resulting dental impression material. A Red Line Smoke Pro® hydrocarbon-mist leak detector is used to detect one or more leaks in an engine as the engine is running. With the throttle valve at least 90% open, the leak detector can be used to look for leaks in the intake air manifold of the engine. Using a fine tip on the end of the THREE BOND™ 2 Part Epoxy Resin Dispenser, the pre-mixed dental impression material can be applied directly to the leaks detected on the running engine. The dental impression material should seal the leak or leaks very quickly in order to return the engine to full performance as rapidly as possible.

Example 12

1 to 3 g of the alkyl polyether composition of Example 6 is shaped into cylinder 1-3 mm in diameter by hand. The crosslinking composition of Example 8 (100 g) is mixed with up to 30 g ESTEREX™ P61 oil and up to 20 g of diatomaceous to create a shapeable paste. Approximately 1-3 g the aforementioned crosslinking composition can be shaped by hand into a 1-3 mm cylinder. A shaped cylinder of each composition can be placed in contact with the other and formed into a twist shape until ready for use. A hydrocarbon-mist leak detector is used to search for leaks in the engine with the engine running. Upon the detection of one or more leaks in the engine, a small portion of the twist shape may be broken off by hand, further mixed, and directly applied to a detected engine leak. The dental impression material so formed should seal the engine leak within a few minutes.

Example 13

With the engine running, a hydrocarbon-mist leak detector is used to detect one or more leaks in an engine. A pre-packaged, commercially available alkyl polyether composition and a pre-packaged, commercially available crosslinking composition, for example, IMPREGUM™ PENTA™ Soft L Impression Material, is pre-mixed and dispensed in accord with packaging instructions from an appropriate mixer, in this case, a PENTAMIX2™ mixer. The pre-mixed dental impression material is applied directly from the mixing tip of the PENTAMIX2™ mixer within three inches of a gas leak in the engine. The pre-mixed dental impression material has a low contact angle with metal surfaces and is particularly good for flowing across metal components of an engine to seal leaks rapidly and effectively to return the engine to optimal performance as quickly as possible.

Example 14

A vacuum gauge leak detector is used to detect leaks in an engine. Pressure gas leaks are detected by applying manifold pressure a region of the engine in pneumatic communication with both of (a) a part of the engine suspected to have one or more gas leaks, and (b) a vacuum gauge. Vacuum leaks are detected by applying a vacuum to a region of the engine in pneumatic communication with both of (a) a part of the engine suspected to have one or more gas leaks, and (b) a vacuum gauge. The components of a pre-packaged IMPREGUM™ PENTA™ Soft H Impression Material are dispensed using the sight method in proportions of 10 parts alkyl polyether composition to approximately 1 part crosslinking composition. The components may be separately dispensed, one on top of the other, on the engine surface within three inches of a detected leak. The two compositions may be further mixed together by hand directly on the engine surface, causing the dental impression material to form by reacting the compositions and allowing the formed dental impression material to seal one or more gas leaks on the engine while observers can see the effectiveness of the so formed dental impression material reflected on the pressure gauge. As the dental impression material seals a vacuum leak, vacuum pressure will increase (pressure further reduced). As the dental impression material seals a pressure leak, pressure will rise up to the value of the pressure source in pneumatic communication with a gas leak.

Example 15

The same method of sealing an engine gas leak as used in Example 13 above may be employed except that a hydrocarbon mist-generating detector is used instead of a pressure gauge.

Example 16

The same method of sealing an engine gas leak as in Example 13 may be used except that instead of applying an external source of pressure or vacuum, the leaks may be detected and sealed with the engine running so as to return the engine to optimal performance as quickly as possible.

Although various exemplary embodiments have been shown and described, the invention is not limited to the embodiments shown or described. Therefore, the scope of the invention is intended to be limited solely by the scope of the claims that follow.

What is claimed is:

1. A method of repairing an engine leak comprising the steps of:
   locating at least one gas leak in an engine;
   applying an alkyl polyether composition and a crosslinking composition to at least one surface of the engine within three inches of the located gas leak;
   allowing a polyether dental impression material to form by reacting the alkyl polyether composition and the crosslinking composition; and
   allowing the formed polyether dental impression material to seal the located gas leak; wherein the alkyl polyether composition has the formula $(L)x\text{-}[G\text{-}Q\text{-}E\text{-}NCH_2CHR]_y$; and
   R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl; or
   R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F; or
   R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and up to five carbon atoms on R is each replaced by any of O, CO, N, and S; or
   R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F and up to five carbon atoms on R is each replaced by any of O, CO, N, and S;
   E is a $C_1$-$C_{18}$ branched or un-branched hydrocarbon chain wherein up to five carbon atoms in the chain is each replaced by any of O and CO;
   G is at least one of C(O)O, C(O)NR, C(O), C(O)C(O), $C(O)(CH_2)_m$, C(O, C(S)NR, and —$CH_2$—, wherein m is in the range of 1 to 10;

Q is at least one of $(-OCH_2CH_2-)_n$ or $(-OCH_2CH(CH_3)-)_n$, wherein n has an average value of 3 to 200;
L is selected from the group consisting of O, S, and NR;
x has a value of 0 or 1; and
y is at least 1.

2. The method of claim 1 wherein:
the alkyl polyether composition is a first shapeable paste and is formed into a first shape;
the crosslinking composition is a second shapeable paste and is formed into a second shape; and
the first shape is placed in at least partial contact with the second shape.

3. The method of claim 2 wherein:
the first shape and the second shape are separated by a removable barrier film.

4. The method of claim 1 wherein:
at least one of the alkyl polyether composition and the crosslinking composition is further comprised of a retarder.

5. The method of claim 4 wherein:
the retarder is selected from the group consisting of epinephrine, 8-hydroxyquinoline sulfate, and $Fe_2(SO4)_2$.

6. The method of claim 1 further comprising:
applying an adhesive composition within three inches of the located gas leak; and
applying the alkyl polyether composition and the crosslinking composition on top of the adhesive composition.

7. The method of claim 1 wherein:
the crosslinking composition is comprised of a compound with the formula $R^1S(O)2NHR^3$, $R^2S(O)_2NHR^3$ or $[R^4S(O)_2N]_a(R^5)_b$ wherein;
$R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl, or
$R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and one or more hydrogen atoms on $R^1$ is each replaced by Cl or F; or
$R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and up to five carbon atoms on $R^1$ is each replaced by any of O, CO, N, and S; or
$R^1$ is at least one of $C_1$-$C_{22}$ alkyl, $C_2$-$C_{12}$ alkenyl, $C_2$-$C_{22}$ alkynyl, $C_7$-$C_{22}$ arylalkyl or $C_3$-$C_{22}$ cycloalkyl and up to five carbon atoms on is each replaced by any of O, CO, N, and S and one or more hydrogen atoms on $R^1$ is each replaced by Cl or F;
$R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl, or
$R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and one or more hydrogen atoms on $R^2$ is each replaced by Cl or F; or
$R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and up to five carbon atoms on $R^2$ is each replaced by any of O, CO, N, and S; or
$R^2$ is at least one of $C_6$-$C_{18}$ aryl, $C_7$-$C_{22}$ alkylaryl, $C_2$-$C_{22}$ cycloalkylaryl, or $C_7$-$C_{22}$ alkynyl aryl and one or more hydrogen atoms on $R^2$ is each replaced by Cl or F and up to five carbon atoms on $R^2$ is each replaced by any of O, CO, N, and S;
$R^3$ is $R^1$ or $R^2$;
$R^4$ is $R^1$ or $R^2$;
$R^5$ is $-CH_2-$ or $-OCH_2CH_2-$ or $-OCH_2CH(CH_3)-$;
a is at least 2; and
b has an average value between 20 and 200.

8. The method of claim 1 wherein:
the applying of the alkyl polyether composition and the crosslinking composition is done while monitoring the engine intake manifold pressure; and repeating the steps above as many times as necessary to cause the engine intake manifold pressure to drop to at least 5 psi when the engine throttle is at least 90% open.

9. The method of claim 1 wherein:
the alkyl polyether composition and the crosslinking composition are pre-mixed.

10. The method of claim 1 wherein:
the alkyl polyether composition and the crosslinking composition are placed in at least partial contact with each other; and
the resulting at least partially contacted compositions are applied to at least one surface of the engine within three inches of the located gas leak.

11. The method of claim 1 wherein:
the alkyl polyether composition is applied to at least a first surface of the engine within three inches of the located gas leak;
the crosslinking composition is applied to at least a second surface of the engine within three inches of the located gas leak; and
the first surface with the applied alkyl polyether composition and the second surface with the applied crosslinking composition are placed in contact.

12. The method of claim 1 wherein:
at least one of the alkyl polyether composition and the crosslinking composition is further comprised of an accelerator.

13. A method of repairing an engine comprising the steps of:
locating at least one gas leak in an engine;
applying an alkyl polyether composition and a crosslinking composition to at least one surface of the engine within three inches of the located gas leak;
allowing a polyether dental impression material to form by reacting the alkyl polyether composition and the crosslinking composition; and
allowing the formed polyether dental impression material to seal the located gas leak;
performing the steps above as many times as necessary to cause the engine intake manifold pressure to drop to at least 5 psi when the engine throttle position is at least 90% open; wherein
the alkyl polyether composition has the formula $(L)_x$-$[G$-$Q$-$E$-$NCH_2CHR]_y$; and
R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl; or
R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F; or
R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and up to five carbon atoms on R is each replaced by any of O, CO, N, and S; or
R is at least one of H, $C_1$-$C_{12}$ alkyl, $C_2$-$C_{12}$ alkenyl, $C_2$-$C_{12}$ alkynyl, $C_7$-$C_{15}$ arylaklyl, or $C_3$-$C_{12}$ cycloalkyl and one or more hydrogen atoms on R is each replaced by Cl or F and up to five carbon atoms on R is each replaced by any of O, CO, N, and S;
E is a $C_1$-$C_{18}$ branched or un-branched hydrocarbon chain wherein up to five carbon atoms in the chain is each replaced by any of O and CO;

G is at least one of C(O)O, C(O)NR, C(O), C(O)C(O), C(O)(CH$_2$)$_m$C(O, C(S)NR, and —CH$_2$— wherein m is in the range of 1 to 10;

Q is at least one of (—OCH$_2$CH$_2$—)$_n$ or (—OCH$_2$CH(CH$_3$)—)$_n$, wherein n has an average value of 3 to 200; and L is selected from the group consisting of O, S, and NR;

x has a value of 0 or 1; and y is at least 1; and the crosslinking composition is comprised of a compound with the formula R$^1$S(O)$_2$NHR$^3$, R$^2$S(O)$_2$NHR$^3$ or [R$^4$S(O)$_2$N]$_a$(R$^5$)$_b$ wherein;

R$^1$ is at least one of C$_1$-C$_{22}$ alkyl, C$_2$-C$_{12}$ alkenyl, C$_2$-C$_{22}$ alkynyl, C$_7$-C$_{22}$ arylalkyl or C$_3$-C$_{22}$ cycloalkyl, or R$^1$ is at least one of C$_1$-C$_{22}$ alkyl, C$_2$-C$_{12}$ alkenyl, C$_2$-C$_{22}$ alkynyl, C$_7$-C$_{22}$ arylalkyl or C$_3$-C$_{22}$ cycloalkyl and one or more hydrogen atoms on R$^1$ is each replaced by Cl or F; or R$^1$ is at least one of C$_1$-C$_{22}$ alkyl, C$_2$-C$_{12}$ alkenyl, C$_2$-C$_{22}$ alkynyl, C$_7$-C$_{22}$ arylalkyl or C$_3$-C$_{22}$ cycloalkyl and up to five carbon atoms on R$^1$ is each replaced by any of O, CO, N, and S; or R$^1$ is at least one of C$_1$-C$_{22}$ alkyl, C$_2$-C$_{12}$ alkenyl, C$_2$-C$_{22}$ alkynyl, C$_7$-C$_{22}$ arylalkyl or C$_3$-C$_{22}$ cycloalkyl and up to five carbon atoms on R$^1$ is each replaced with any of O, CO, N, and S and one or more hydrogen atoms on R$^1$ is each replaced by Cl or F;

R$^2$ is at least one of C$_6$-C$_{18}$ aryl, C$_7$-C$_{22}$ alkylaryl, C$_2$-C$_{22}$ cycloalkylaryl, or C$_7$-C$_{22}$ alkynyl aryl, or R$^2$ is at least one of C$_6$-C$_{18}$ aryl, C$_7$-C$_{22}$ alkylaryl, C$_2$-C$_{22}$ cycloalkylaryl, or C$_7$-C$_{22}$ alkynyl aryl and one or more hydrogen atoms on R$^2$ is each replaced by Cl or F; or R$^2$ is at least one of C$_6$-C$_{18}$ aryl, C$_7$-C$_{22}$ alkylaryl, C$_2$-C$_{22}$ cycloalkylaryl, or C$_7$-C$_{22}$ alkynyl aryl and up to five carbon atoms on R$^2$ is each replaced by any of O, CO, N, and S; or R$^2$ is at least one of C$_6$-C$_{18}$ aryl, C$_7$-C$_{22}$ alkylaryl, C$_2$-C$_{22}$ cycloalkylaryl, or C$_7$-C$_{22}$ alkynyl aryl and one or more hydrogen atoms on R$^2$ is each replaced by Cl or F and up to five carbon atoms on R$^2$ is each replaced by any of O, CO, N, and S R$^3$ is R$^1$ or R$^2$;

R$^4$ is R$^1$ or R$^2$;

R$^5$ is —CH$_2$— or —OCH$_2$CH$_2$— or —OCH$_2$CH(CH$_3$)—;

a is at least 2; and b has an average value between 20 and 200.

14. The method of claim 13 wherein:

the applying at least one of the alkyl polyether composition and the crosslinking composition is done while monitoring the engine intake manifold pressure; and repeating the steps above as many times as necessary to cause the engine intake manifold pressure to drop to at least 5 psi when the engine throttle position is at least 90% open.

15. The method of claim 13 wherein:

the alkyl polyether composition and the crosslinking composition are pre-mixed.

* * * * *